United States Patent
Huang (10) Patent No.: US 10,264,243 B2
(45) Date of Patent: Apr. 16, 2019

(54) STEREO DISPLAY DEVICE

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 112 days.

(21) Appl. No.: 15/410,775

(22) Filed: Jan. 20, 2017

(65) Prior Publication Data
US 2018/0131925 A1 May 10, 2018

(30) Foreign Application Priority Data

Nov. 4, 2016 (TW) ............................. 105135818 A (51) Int. Cl.
| | | |
|---|---|---|
| *G02B 27/22* | (2018.01) | |
| *H04N 13/305* | (2018.01) | |
| *H04N 13/324* | (2018.01) | |
| *H04N 13/398* | (2018.01) | |
| *G02B 3/00* | (2006.01) | |
| *G02B 3/06* | (2006.01) | |

(Continued)

(52) U.S. Cl.
CPC ............ *H04N 13/305* (2018.05); *G02B 3/005* (2013.01); *G02B 3/0062* (2013.01); *G02B 3/06* (2013.01);
(Continued)

(58) Field of Classification Search
CPC .. H04N 13/305; H04N 13/398; H04N 13/317; H04N 13/349; H04N 13/324;
(Continued)

(56) References Cited

U.S. PATENT DOCUMENTS 6,064,424 A * 5/2000 Van Berkel ........ G02B 27/2214
348/51
7,446,733 B1 * 11/2008 Hirimai .................. G02B 3/005
345/32

(Continued)

FOREIGN PATENT DOCUMENTS

| CN | 102053378 A | 5/2011 |
|---|---|---|
| TW | 201323927 A | 6/2013 |
| TW | I514006 B | 12/2015 |

OTHER PUBLICATIONS

The pertinent parts of US20020021492A1.

*Primary Examiner* — Howard D Brown, Jr.
(74) *Attorney, Agent, or Firm* — CKC & Partners Co., LLC (57) ABSTRACT

A stereo display device includes a light source module, a portrait display module, and first, second, and third lenticular lens. The light source module sequentially provides a plurality of groups of timing light. The first lenticular lens is disposed in front of the light source module. The second lenticular lens is disposed in front of the first lenticular lens. The portrait display module is disposed in front of the second lenticular lens. By two optical Fourier transforms performed by the first and second lenticular lens, different groups of timing light are respectively focused on different sub-regions of each of the pixels of the portrait display module. The portrait display module transforms the timing light focused on the pixels into a plurality of groups of pixel light. The third lenticular lens is disposed in front of the portrait display module and directs the pixel light to a plurality of views.

9 Claims, 8 Drawing Sheets

(51) Int. Cl.
*H04N 13/349* (2018.01)
*H04N 13/317* (2018.01)
*G02F 1/1335* (2006.01)

(52) U.S. Cl.
CPC ..... *G02B 27/2214* (2013.01); *G02B 27/2264* (2013.01); *H04N 13/317* (2018.05); *H04N 13/324* (2018.05); *H04N 13/349* (2018.05); *H04N 13/398* (2018.05); *G02F 2001/133607* (2013.01)

(58) Field of Classification Search
CPC .. G02B 27/2214; G02B 3/06; G02B 27/2264; G02B 3/005; G02B 3/0062; H05K 999/99; G02F 2001/133607
See application file for complete search history.

(56) References Cited

U.S. PATENT DOCUMENTS

| | | | |
|---|---|---|---|
| 8,427,527 B2 * | 4/2013 | Visser | H04N 13/0406 348/42 |
| 2002/0021492 A1 | 2/2002 | Morishima et al. | |
| 2008/0036853 A1 * | 2/2008 | Shestak | H04N 13/32 348/51 |
| 2008/0297671 A1 * | 12/2008 | Cha | G09G 3/003 349/15 |
| 2010/0188439 A1 * | 7/2010 | Sugimoto | G09G 3/342 345/690 |
| 2011/0096071 A1 | 4/2011 | Okamoto et al. | |
| 2013/0094079 A1 * | 4/2013 | Fujishiro | G02B 3/0031 359/463 |
| 2013/0094080 A1 * | 4/2013 | Fujishiro | G02B 27/2214 359/463 |
| 2013/0147854 A1 | 6/2013 | Huang et al. | |
| 2013/0155377 A1 * | 6/2013 | Huang | G02B 27/2214 353/7 |
| 2013/0321718 A1 * | 12/2013 | Huang | H04N 13/0418 349/5 |
| 2015/0131058 A1 * | 5/2015 | Huang | G02B 27/2214 353/7 |
| 2015/0260999 A1 * | 9/2015 | Wang | G02B 27/2214 349/15 |

* cited by examiner

STEREO DISPLAY DEVICE

RELATED APPLICATIONS

This application claims priority to Taiwanese Application Serial Number 105135818, filed Nov. 4, 2016, which are herein incorporated by reference.

BACKGROUND

Technical Field

The present disclosure relates to a stereo display device.

Description of Related Art

The left eye and the right eye of a human being observe images slightly differently, which fundamentally results in a sense of stereopsis. As such, auto-stereoscopic displays take advantage of this vision characteristic of the human eyes to generate stereopsis.

The typical method to generate stereopsis is a spatial-multiplex method; that is, pixels on the screen are divided into different groups through dispersing of the lens to form a plurality of views when light emitted from the pixels converges at a viewing distance. The two eyes of a human acquire images from the respective two views, so as to generate the stereopsis of image.

To further improve the stereo display device, considerable efforts have been devoted to discovering new solutions. The application and improvement of the stereo display device has become one of the most important research topics.

SUMMARY

This disclosure provides a stereo display device to generate the spatial-multiplex effect and the time-multiplex effect by a simple optical configuration.

In one aspect of the disclosure, a stereo display device is provided. The stereo display device includes a light source module, a first lenticular lens, a second lenticular lens, a portrait display module, and a third lenticular lens. The light source module sequentially provides a plurality of groups of timing light. The first lenticular lens is disposed in front of the light source module and respectively directs the timing light from the light source module to travel in a plurality of groups of directions, in which the light source module is located on a focal plane of the first lenticular lens. The second lenticular lens is disposed in front of the first lenticular lens. The portrait display module is disposed in front of the second lenticular lens. The portrait display module is located on a focal plane of the second lenticular lens. The portrait display module includes a plurality of pixels, and each of the pixels includes a plurality of sub-regions. The second lenticular lens respectively focuses the timing light traveling in the groups of the directions to a plurality of groups of focus regions, and the focus regions respectively correspond to the sub-regions. The portrait display module respectively transforms the timing light focused on the focus regions into a plurality of groups of pixel light. The third lenticular lens is disposed in front of the portrait display module and respectively directs the pixel light to a plurality of views.

In one or more embodiments, the stereo display device has a first direction (for example, the horizontal direction) and a second direction perpendicular to the first direction (for example, the vertical direction), and the pixels are disposed along the first direction and the second direction. Each of the pixels includes a plurality of sub-pixels with different colors, and the sub-pixels are disposed along the second direction side by side. The first lenticular lens has a plurality of first cylindrical lenses, the second lenticular lens has a plurality of second cylindrical lenses, and the third lenticular lens has a plurality of third cylindrical lenses. Long axes of the first cylindrical lenses are perpendicular to the first direction; long axes of the second cylindrical lenses are perpendicular to the first direction; and long axes of the third cylindrical lenses are slanted with respect to the first direction.

In one or more embodiments, the portrait display module is located on a focal plane of the third lenticular lens.

In one or more embodiments, the first lenticular lens has a first focal length; each of the first cylindrical lenses has a first pitch along the first direction; the second lenticular lens has a second focal length; each of the second cylindrical lenses has a second pitch along the first direction; and a ratio of the first focal length to the second focal length is the same with a ratio of the first pitch to the second pitch.

In one or more embodiments, each of the pixels has a first width along the first direction, and the first width is the same with the second pitch.

In one or more embodiments, the light source module includes a plurality of white light sources.

In one or more embodiments, each of the first cylindrical lenses is divided into K parts along the first direction, and the parts respectively correspond to K groups of the white light sources. The first lenticular lens is configured to respectively direct K groups of the timing light to travel in K groups of the directions, and each of the pixels comprises K sub-regions. The second lenticular lens is configured to respectively focus the K groups of the timing light traveling in the K groups of the directions to K groups of the focus regions, and the K groups of the focus regions respectively correspond to the K sub-regions.

In one or more embodiments, the light source module includes a plurality of red light sources, a plurality of green light sources, and a plurality of blue light sources.

In one or more embodiments, each of the first cylindrical lenses is divided into 3K parts along the first direction, and the parts respectively correspond to K groups of the red light sources, K groups of the green light sources, and K groups of the blue light sources. The K groups of the red light sources, the K groups of the green light sources, and the K groups of the blue light sources form 3K groups of the timing light. The first lenticular lens is configured to respectively direct the 3K groups of the timing light to travel in 3K groups of the directions. Each of the pixels includes K sub-regions, and each of the sub-regions includes a red sub-pixel sub-region, a blue sub-pixel sub-region, and a green sub-pixel sub-region. The second lenticular lens is configured to respectively focus the 3K groups of the timing light traveling in the 3K groups of the directions to 3K groups of the focus regions, and the 3K groups of the focus regions respectively correspond to the K red sub-pixel sub-regions, the K blue sub-pixel sub-regions, and the K green sub-pixel sub-regions.

By performing two optical Fourier transforms on different groups of the light from the light source module by the first lenticular lens and the second lenticular lens, different groups of the light will be respectively focused to different sub-pixel sub-regions. Because different groups of the light are respectively generated in the first timing and the second timing, pixels can display different images in the first timing and the second timing, such that the pixel light transformed from different groups of the light focused to different sub-pixel sub regions displays different images. Because pixel light formed by different sub-pixel sub-regions will be directed to different views by the third lenticular lens (in that the deposition positions of different sub-pixel sub-regions are different), the pixel light formed in different timings will be directed to different views by the third lenticular lens. For example, when there are a first timing and a second timing in a cycle, in which the pixel light formed in the first timing is directed to five views by the third lenticular lens and the pixel light formed in the second timing is directed to other five views by the third lenticular lens, the image resolution observed by the user in each view will be one-fifth of the resolution of the portrait display module. However, there are ten images in ten views generated by the stereo display device. In other words, the stereo display device uses a simple optical configuration to generate the spatial-multiplex effect and the time-multiplex effect. The spatial-multiplex effect generates K different images in K views when the image resolution observed by the user in each view is 1/K of the resolution of the portrait display module. The time-multiplex effect makes the number of the views become N times of the original number (the multiplier equals the number of the timings), such that the number of views becomes N×K.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
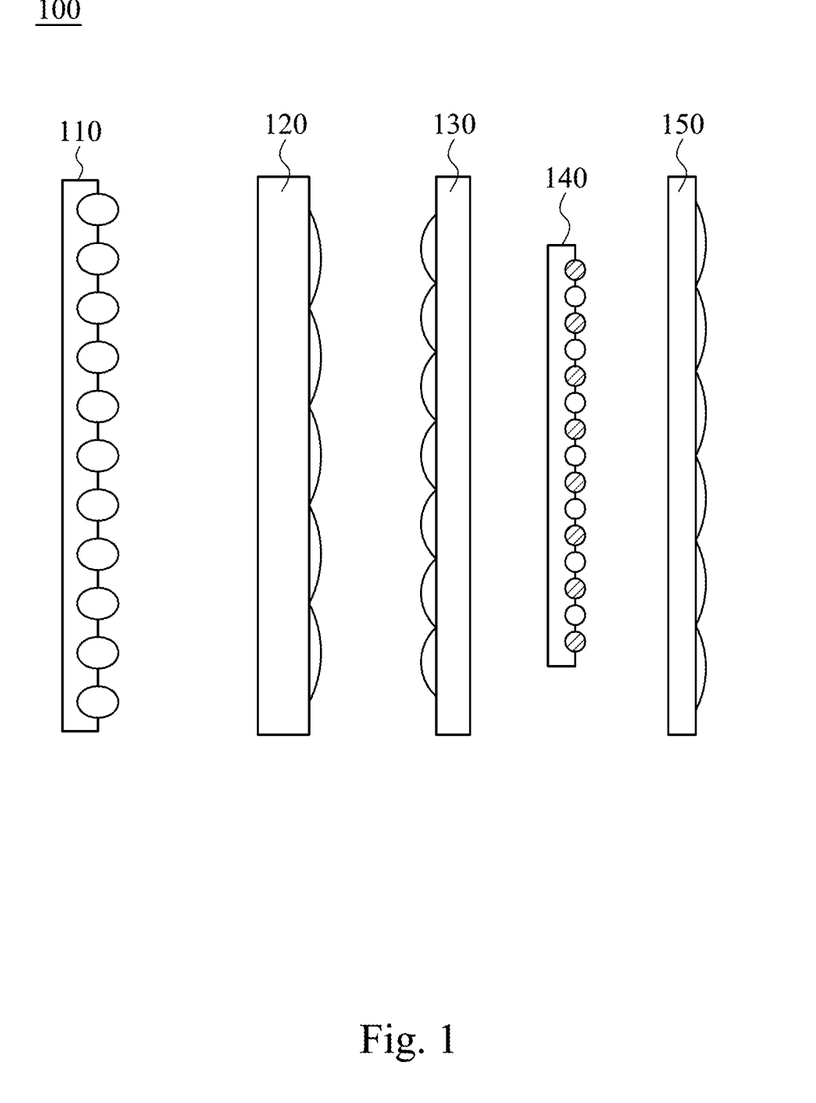
FIG. 1 is a schematic top view of a stereo display device according to one embodiment of this disclosure.

FIG. 1 is a schematic top view of a stereo display device 100 according to one embodiment of this disclosure. A stereo display device 100 is provided. The stereo display device 100 uses a simple optical configuration (mainly composed of three lenticular lenses) to generate the spatial-multiplex effect and the time-multiplex effect. Further, the stereo display device 100 is a display device including a portrait display module.

As shown in FIG. 1, the stereo display device 100 includes a light source module 110, a first lenticular lens 120, a second lenticular lens 130, a portrait display module 140, and a third lenticular lens 150. The light source module 110 sequentially provides a plurality of groups of timing light according to a plurality of timings in a cycle. The first lenticular lens 120 is disposed in front of the light source module 110 (along the light path direction) and respectively directs the timing light from the light source module 110 to travel in a plurality of groups of directions. The light source module 110 is located on a focal plane of the first lenticular lens 120. The second lenticular lens 130 is disposed in front of the first lenticular lens 120. The portrait display module 140 is disposed in front of the second lenticular lens 130, and the portrait display module 140 is located on a focal plane of the second lenticular lens 130. The portrait display module 140 includes a plurality of pixels 141, and each of the pixels 141 includes a plurality of sub-regions. The second lenticular lens 130 focuses the timing light traveling in the groups of the directions to a plurality of groups of focus regions, and different groups of the focus regions respectively correspond to different sub-regions. The portrait display module 140 respectively transforms the timing light focused on different groups of the focus regions into a plurality of groups of pixel light (the detailed information will be described thereafter). The third lenticular lens 150 is disposed in front of the portrait display module 140 and respectively directs different groups of the pixel light to a plurality of views.

Figure 2:
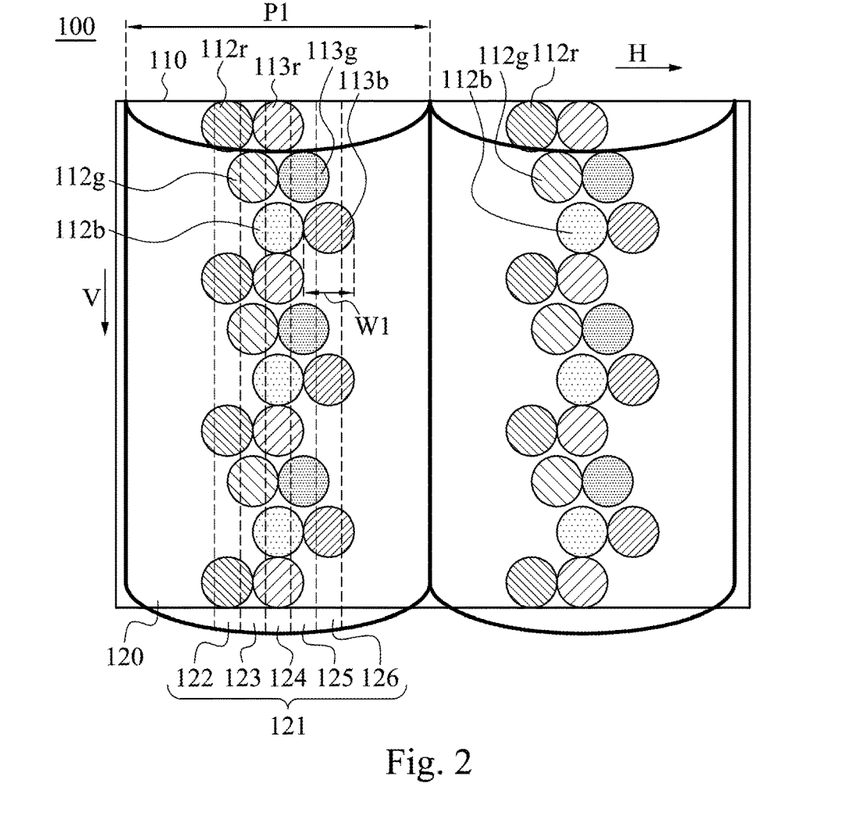
FIG. 2 is a schematic partial front view of a light source module and a first lenticular lens according to one embodiment of this disclosure.

FIG. 2 is a schematic partial front view of the light source module 110 and the first lenticular lens 120 according to one embodiment of this disclosure. As shown in FIG. 2, the light source module 110 includes a plurality of light sources. The light sources includes a plurality of first red light sources 112r, a plurality of second red light sources 113r, a plurality of first green light sources 112g, a plurality of second green light sources 113g, a plurality of first blue light sources 112b, and a plurality of second blue light sources 113b.

The stereo display device 100 has a first direction H and a second direction V perpendicular to the first direction H. In some embodiments, the first direction H is a horizontal direction, and the second direction V is a vertical direction. Each of the light sources has a width W1 along the first direction H. Each of the first green light sources 112g is disposed on the lower right side of each of the first red light sources 112r, and the length of the orthogonal projections of the spacing between the centers of the first red light sources 112r and the first green light sources 112g along the first direction H is one half of the width W1. Each of the first blue light sources 112b is disposed on the lower right side of each of the first green light sources 112g, and the length of the orthogonal projections of the spacing between the centers of the first blue light sources 112b and the first green light sources 112g along the first direction H is one half of the width W1. Each of the second red light sources 113r is disposed on the right side of each of the first red light sources 112r, and the length of the spacing between the centers of the second red light sources 113r and the first red light sources 112r equals the width W1. Each of the second green light sources 113g is disposed on the right side of each of the first green light sources 112g, and the length of the spacing between the centers of the second green light sources 113g and the first green light sources 112g equals the width W1. Each of the second blue light sources 113b is disposed on the right side of each of the first blue light sources 112b, and the length of the spacing between the centers of the second blue light sources 113b and the first blue light sources 112b equals the width W1. The length of the spacing between the first red light sources 112r and the adjacent first red light sources 112r along the first direction H is six times the width W1. The length of the spacing between the first green light sources 112g and the adjacent first green light sources 112g along the first direction H is six times the width W1. The length of the spacing between the first blue light sources 112b and the adjacent first blue light sources 112b along the first direction H is six times the width W1.

The first lenticular lens 120 has a plurality of first cylindrical lenses 121, and long axes of the first cylindrical lenses 121 are perpendicular to the first direction H. Each of the first cylindrical lenses 121 has a pitch P1 along the first direction H, and the pitch P1 is six times the width W1.

In some embodiments, the light sources are light-emitting diodes. Embodiments of this disclosure are not limited thereto. The person having ordinary skill in the art can make proper modifications to the light sources depending on the actual application.

Each of the first cylindrical lenses 121 is divided into a first part 122, a second part 123, a third part 124, a fourth part 125, and a fifth part 126 along the first direction H. The first part 122 corresponds to the first red light sources 122, the second part 123 corresponds to the first green light sources 112g, the third part 124 corresponds to the first blue light sources 112b and the second red light sources 113r, the fourth part 125 corresponds to the second green light sources 113g, and the fifth part 126 corresponds to the second blue light sources 113b. Except the first part 12, the second part 123, the third part 124, the fourth part 125, and the fifth part 126, the first cylindrical lens 121 also includes other parts, but other parts of the first cylindrical lens 121 will not be discussed here.

In addition, the first red light sources 112r, the first green light sources 112g, and the first blue light sources 112b emit light in a first timing, and the second red light sources 113r, the second green light sources 113g, and the second blue light sources 113b emit light in a second timing.

The orthogonal projection of the first part 122 along a direction perpendicular to the first direction H and the second direction V overlaps the deposition positions of the first red light sources 112r, i.e., the first part 122 corresponds to the first red light sources 112. The orthogonal projection of the second part 123 along the direction perpendicular to the first direction H and the second direction V overlaps the deposition positions of the first green light sources 112g, i.e., the second part 123 corresponds to the first green light sources 112g. The orthogonal projection of the third part 124 along the direction perpendicular to the first direction H and the second direction V overlaps the deposition positions of the first blue light sources 112b and the second red light sources 113r, i.e., the third part 124 corresponds to the first blue light sources 112b and the second red light sources 113r. The orthogonal projection of the fourth part 125 along the direction perpendicular to the first direction H and the second direction V overlaps the deposition positions of the second green light sources 113g, i.e., the fourth part 125 corresponds to the second green light sources 113g. The orthogonal projection of the fifth part 126 along the direction perpendicular to the first direction H and the second direction V overlaps the deposition positions of the second blue light sources 113b, i.e., the fifth part 126 corresponds to the second blue light sources 113b.

Figure 3:
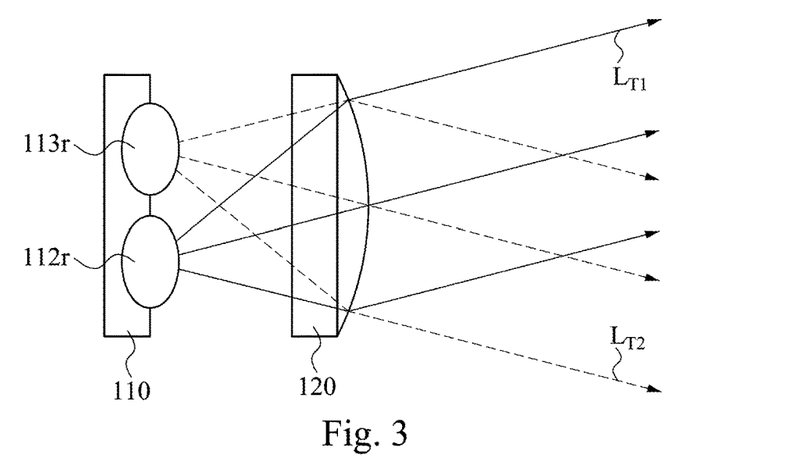
FIG. 3 is a schematic top view of the light source module and the first lenticular lens with light paths according to one embodiment of this disclosure.

FIG. 3 is a schematic top view of the light source module 110 and the first lenticular lens 120 with light paths according to one embodiment of this disclosure. As shown in FIG. 2 and FIG. 3, because the first red light sources 112r and the second red light sources 113r respectively correspond to the first part 122 and the third part 124 of the first lenticular lens, the first lenticular lens 120 directs the first light $L_{T1}$ emitted by the first red light sources 112r in the first timing to travel in a first group of directions and directs the second light $L_{T2}$ emitted by the second red light sources 113r in the second timing to travel in a second group of directions. Similarly, because the first green light sources 112g, the second green light sources 113g, the first blue light sources 112b, and the second blue light sources 113b respectively correspond to different parts of the first lenticular lens, the first lenticular lens 120 respectively directs the light emitted by the first green light sources 112g, the second green light sources 113g, the first blue light sources 112b, and the second blue light sources 113b to travel in different groups of directions (because the first blue light sources 112b and the second red light sources 113r all correspond to the third part of the first lenticular lens 120, the first lenticular lens 120 directs the light emitted by the first blue light sources 112b and the second red light sources 113r to travel in the same group of the directions).

The first group of the directions can include only one direction or a plurality of different directions. The second group of the directions can include only one direction or a plurality of different directions. For example, the first group of the directions includes a first direction and a second direction, and the second group of the directions includes a third direction and a fourth direction. The first direction, the second direction, the third direction, and the fourth direction are not parallel to each other.

Figure 4:
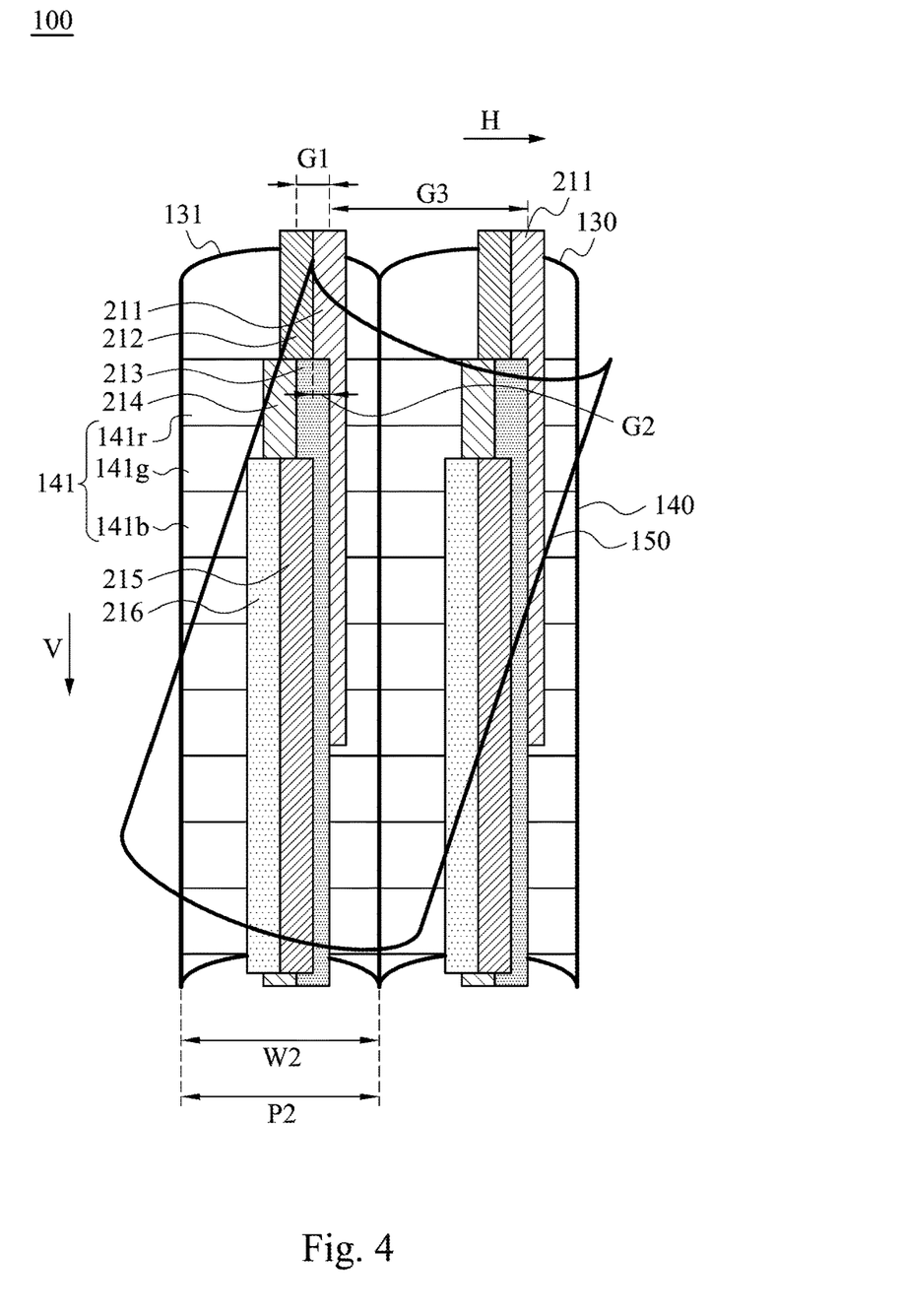
FIG. 4 is a schematic partial front view of a portrait display module, a second lenticular lens, and a third lenticular lens according to one embodiment of this disclosure.

FIG. 4 is a schematic partial front view of the portrait display module 140, the second lenticular lens 130, and the third lenticular lens 150 according to one embodiment of this disclosure. As shown in FIG. 1, FIG. 3, and FIG. 4, the pixels 141 are disposed along the first direction H and the second direction V. Each of the pixels 141 includes a red sub-pixel 141r, a green sub-pixel 141g, and a blue sub-pixel 141b, and the red sub-pixel 141r, the green sub-pixel 141g, and the blue sub-pixel 141b are disposed along the second direction V side by side.

Figure 5:
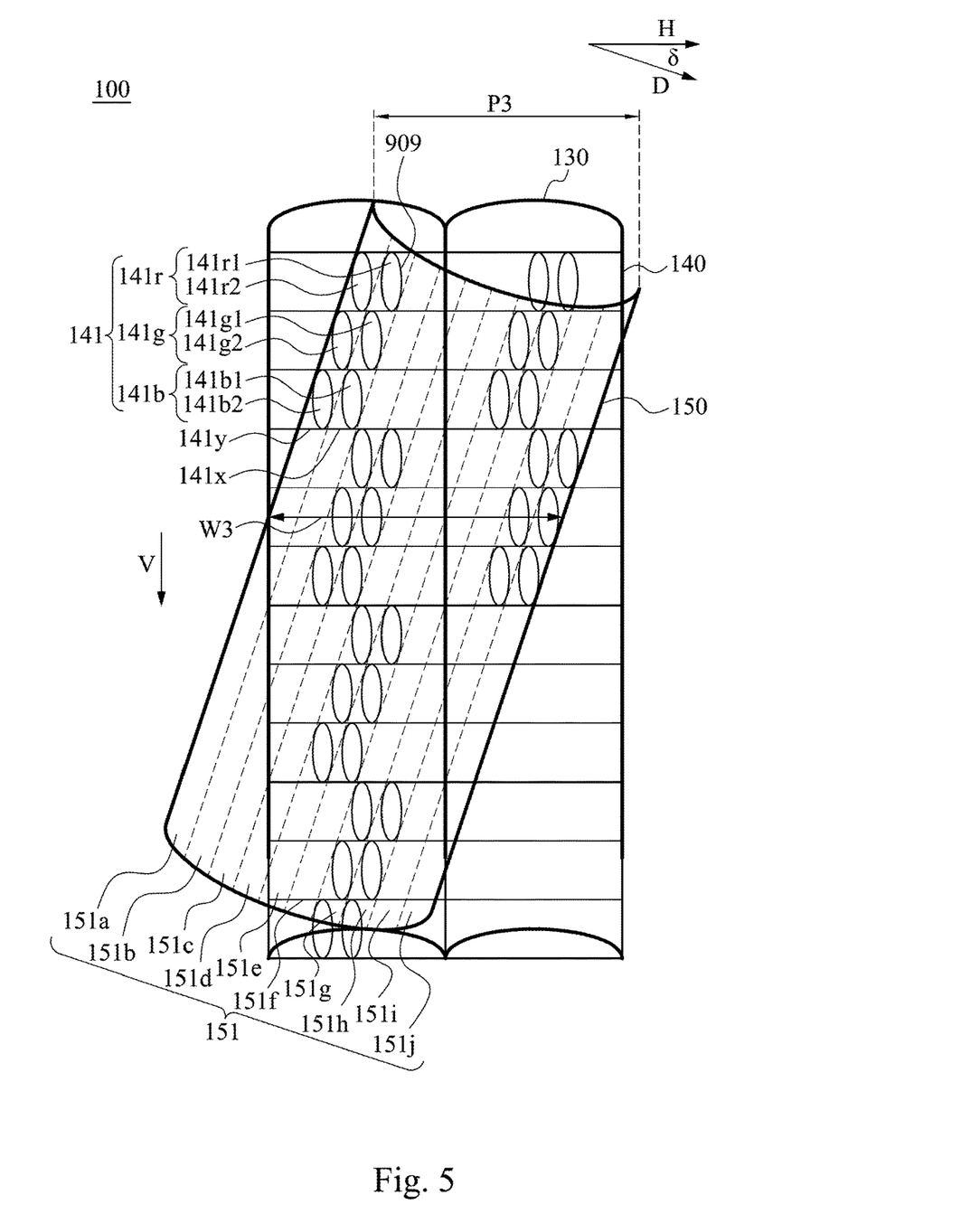
FIG. 5 is a schematic partial front view of the portrait display module and the third lenticular lens according to one embodiment of this disclosure.

FIG. 5 is a schematic partial front view of the portrait display module 140 and the third lenticular lens 150 according to one embodiment of this disclosure. As shown in FIG. 3, FIG. 4, and FIG. 5, the red sub-pixels 141 are further divided into red sub-pixel first sub-regions 141r1 (see FIG. 5) and red sub-pixel second sub-regions 141r2 (see FIG. 5) along the first direction H. Marks 909 indicate the red sub-pixel first sub-regions 141r1 and the red sub-pixel second sub-regions 141r2. The second lenticular lens 130 focuses the first light $L_{T1}$ traveling in the first group of the directions to first focus regions 211 and the second light $L_{T2}$ traveling in the second group of the directions to second focus regions 212. The first focus regions 211 correspond to the red sub-pixel first sub-regions 141r1, and the second focus regions 212 correspond to the red sub-pixel second sub-regions 141r2.

Besides the red sub-pixel first sub-regions 141r1 and the red sub-pixel second sub-regions 141r2, the red sub-pixels 141r also include other parts, but other parts of the red sub-pixels 141r will not be discussed here.

Similarly, the second lenticular lens 130 respectively focus the light traveling in different groups of directions to different focus regions. Specifically, the second lenticular lens 130 focuses the light emitted by the first green sources 112g to third focus regions 213, the light emitted by the second green sources 113g to fourth focus regions 214, the light emitted by the first blue light sources 112b to the fifth focus regions 215, and the light emitted by the second blue light sources 113b to the sixth focus regions 216. The green sub-pixels 141g are further divided into green sub-pixel first sub-regions 141g1 (see FIG. 5) and green sub-pixel second sub-regions 141g2 (see FIG. 5) along the first direction H. The blue sub-pixels 141b are further divided into blue sub-pixel first sub-regions 141b1 (see FIG. 5) and blue sub-pixel second sub-regions 141b2 (see FIG. 5) along the first direction H. Marks 909 indicate the green sub-pixel first sub-regions 141g1, the green sub-pixel second sub-regions 141g2, the blue sub-pixel first sub-regions 141b1, and the blue sub-pixel second sub-regions 141b2 corresponding to different focus regions. The third focus regions 213 correspond to the green sub-pixel first sub-regions 141g1, the fourth focus regions 214 correspond to the green sub-pixel second sub-regions 141g2, the fifth focus regions 215 correspond to the blue sub-pixel first sub-regions 141b1, and the sixth focus regions 216 correspond to the blue sub-pixel second sub-regions 141b2.

The second focus regions 212 and the fifth focus regions 215 are substantially the same regions. In addition, besides the green sub-pixel first sub-regions 141g1 and the green sub-pixel second sub-regions 141g2, each of the green sub-pixels 141g also includes other parts. Besides the blue sub-pixel first sub-regions 141b1 and the blue sub-pixel second sub-regions 141b2, each of the blue sub-pixels 141b also includes other parts. Other parts of the green sub-pixels 141g and other parts of the blue sub-pixels 141b will not be discussed here.

Therefore, in the portrait display module 140, the red sub-pixel first sub-region 141r1 of each of the pixels 141 transforms the first light $L_{T1}$ focused to the first focus regions 211 into pixel light, the red sub-pixel second sub-region 141r2 of each of the pixels 141 transforms the second light $L_{T2}$ focused to the first focus regions 212 into pixel light, the green sub-pixel first sub-region 141g1 of each of the pixels 141 transforms the light focused to the third focus regions 213 into pixel light, the green sub-pixel second sub-region 141g2 of each of the pixels 141 transforms the light focused to the fourth focus regions 214 into pixel light, the blue sub-pixel first sub-region 141b1 of each of the pixels 141 transforms the light focused to the fifth focus regions 215 into pixel light, the blue sub-pixel second sub-region 141b2 of each of the pixels 141 transforms the light focused to the sixth focus regions 216 into pixel light.

It is noted that only light emitted by the red light sources can pass the red sub-pixels 141r, and light emitted by the green light sources and the blue light sources cannot pass the red sub-pixels 141r. Therefore, light emitted by the first green light sources 112g, the second green light sources 113g, the first blue light sources 112b, and the second blue light sources 113b can be considered absent for the red sub-pixels 141r. Similarly, light emitted by the first red light sources 112r, the second red light sources 113r, the first blue light sources 112b, and the second blue light sources 113b can be considered absent for the green sub-pixels 141g. Light emitted by the first red light sources 112r, the second red light sources 113r, the first green light sources 112g, and the second green light sources 113g can be considered absent for the blue sub-pixels 141b.

Because the light source module 110 is located on the focal plane of the first lenticular lens 120, and the portrait display module 140 is located on the focal plane of the second lenticular lens 130, two optical Fourier transforms are performed on the light emitted from the first red light sources 112r, the second red light sources 113r, the first green light sources 112g, the second green light sources 113g, the first blue light sources 112b, and the second blue light sources 113b by the first lenticular lens 120 and the second lenticular lens 130. After the two optical Fourier transforms are performed, the light emitted from the light sources will be naturally focused to the first focus regions 211, the second focus regions 212, the third focus regions 213, the fourth focus regions 214, the fifth focus regions 215, and the sixth focus regions 216. Each of the focus regions is strip-shaped, and the direction of the strips is perpendicular to the first direction H.

As shown in FIG. 2 and FIG. 4, a gap G1 between the center line of the first focus region 211 and the center line of the adjacent second focus region 212 along the first direction H is determined by the first focal length of the first lenticular lens 120, the second focal length of the second lenticular lens 130, and the spacing between the centers of the first red light sources 112r and the second red light sources 113r, which equal the width W1.

The ratio of the spacing between the centers of the first red light source 112r and the second red light source 113r, which equals the width W1, to the spacing G1 is the same as the ratio of the first focal length of the first lenticular lens 120 to the second focal length of the second lenticular lens 130. In other words, by well designing the ratio of the first focal length of the first lenticular lens 120 to the second focal length of the second lenticular lens 130, the first light $L_{T1}$ emitted by the first red light sources 112r will be properly focused to the red sub-pixel first sub-region 141r1, and the second light $L_{T2}$ emitted by the second red light sources 113r will be properly focused to the red sub-pixel second sub-region 141r2.

Similarly, the ratio of the length of the orthogonal projection of the spacing between the centers of the first red light source 112r and the first green light source 112g along the first direction H, which equals one half of the width W1, to the spacing G2 between the center line of the first focus region 211 and the center line of the adjacent third focus region 213 along the first direction H is the same as the ratio of the first focal length of the first lenticular lens 120 to the second focal length of the second lenticular lens 130. The ratio of the length of the spacing between the first red light source 112r and the adjacent first red light source 112r along the first direction H, which equals six times the width W1, to the spacing G3 between the center line of the first focus region 211 and the center line of the adjacent first focus region 211 along the first direction H is the same as the ratio of the first focal length of the first lenticular lens 120 to the second focal length of the second lenticular lens 130. The length of the spacing G3 equals the width of one pixel, and the spacing G3 equals six times the spacing G1.

Further, the second lenticular lens 130 has a plurality of second cylindrical lenses 131, and long axes of the second cylindrical lenses 131 are perpendicular to the first direction H. Each of the second cylindrical lenses 131 has a pitch P2 along the first direction H, and the ratio of the pitch P1 of the first cylindrical lens 121 to the pitch P2 of the second cylindrical lens 131 is the same with the ratio of the first focal length to the second focal length. Other ratio relationships are similar to the aforementioned ratio relationships, and other ratio relationships will not be described here.

In addition, each of the pixels 141 has a width W2 along the first direction H, and the width W2 is the same with the pitch P2.

As shown in FIG. 5, the third lenticular lens 150 has a plurality of third cylindrical lenses 151, and long axes of the third cylindrical lenses 151 are slanted with respect to the first direction H and the second direction V. Specifically, the stereo display device 100 further has a third direction D perpendicular to the long axes of the third cylindrical lenses 151. Each of the third cylindrical lenses 151 is divided into a first part 151a, a second part 151b, a third part 151c, a fourth part 151d, a fifth part 151e, a sixth part 151f, a seventh part 151g, an eighth part 151h, a ninth part 151i, and a tenth part 151j along the third direction D. The first part 151a, the second part 151b, the third part 151c, the fourth part 151d, the fifth part 151e, the sixth part 151f, the seventh part 151g, the eighth part 151h, the ninth part 151i, and the tenth part 151j respectively correspond to ten groups of pixel sub-regions. For example, the first part 151a corresponds to one group of the red sub-pixel second sub-regions 141r2, the green sub-pixel second sub-regions 141g2, and the blue sub-pixel second sub-regions 141b2, and the group of the red sub-pixel second sub-regions 141r2, the green sub-pixel second sub-regions 141g2, and the blue sub-pixel second sub-regions 141b2 form one group of pixel second sub-regions 141y. The second part 151b corresponds to one group of the red sub-pixel first sub-regions 141r1, the green sub-pixel first sub-regions 141g1, and the blue sub-pixel first sub-regions 141b1, and the group of the red sub-pixel first sub-regions 141r1, the green sub-pixel first sub-regions 141g1, and the blue sub-pixel first sub-regions 141b1 form one group of pixel first sub-regions 141x.

Specifically, as shown in FIG. 5, the angle δ between the first direction H and the third direction D is $\tan^{-1}(1/3)$. Embodiments of this disclosure are not limited thereto. In other embodiments, the magnitude of the angle δ between the first direction H and the third direction D may be different from the magnitude of the angle δ in this embodiment. For example, the angle δ may be $\tan^{-1}(1/2)$ or $\tan^{-1}(1/4)$. It is noted that when the magnitude of the angle δ is changed, the deposition positions of the light sources of the light source module 110 are correspondingly changed.

Therefore, the third lenticular lens 150 respectively directs ten groups of the pixel light generated by ten groups of the pixel sub-regions to ten views.

The orthogonal projections of the ten parts along a direction perpendicular to the first direction H and the second direction V overlap the centers of the deposition positions of different groups of the pixel sub-regions, i.e., the first part 151a, the second part 151b, the third part 151c, the fourth part 151d, the fifth part 151e, the sixth part 151f, the seventh part 151g, the eighth part 151h, the ninth part 151i, and the tenth part 151j respectively correspond to ten groups of pixel sub-regions. For example, the orthogonal projection of the first part 151a along the direction perpendicular to the first direction H and the second direction V overlaps the centers of the deposition positions of one group of the pixel second sub-regions 141y, i.e., the first part 151a corresponds to one group of pixel second sub-regions 141y. The orthogonal projection of the second part 151b along the direction perpendicular to the first direction H and the second direction V overlaps the centers of the deposition positions of one group of the pixel first sub-regions 141x, i.e., the second part 151b corresponds to one group of pixel first sub-regions 141x.

Figure 6:
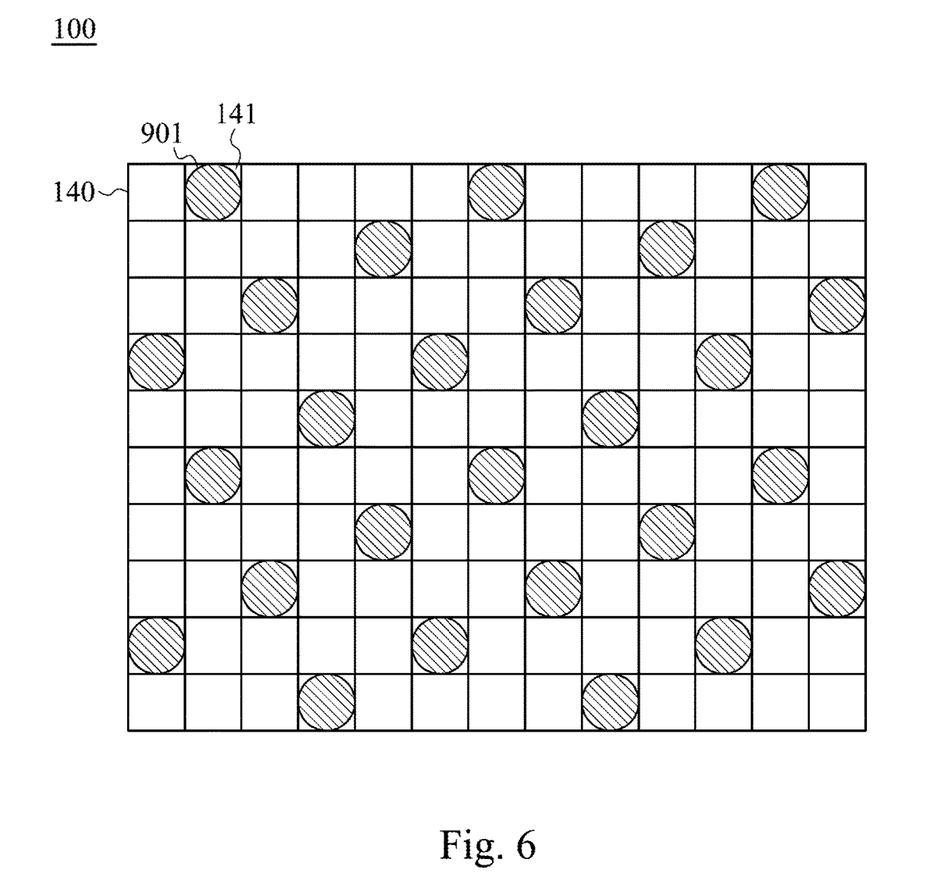
FIG. 6 is a schematic partial front view of the portrait display module according to one embodiment of this disclosure.

FIG. 6 is a schematic partial front view of the portrait display module 100 according to one embodiment of this disclosure. As shown in FIG. 6, in one of the views, the user will see pixels 141 depicted by marks 901. The user will see pixels 141 in similar patterns in other views. Therefore, the image resolution observed by the user in each view will be one-fifth of the resolution of the portrait display module 140. It is noted that the patterns formed by the pixels 141 depicted by the marks 901 are evenly distributed, so as to effectively enhance the display quality.

By performing two optical Fourier transforms on different groups of the light from the light source module 110 (for example, the first light $L_{T1}$ and the second light $L_{T2}$) by the first lenticular lens 120 and the second lenticular lens 130, different groups of the light will be respectively focus to different groups of the pixel sub-regions. Because different groups of the light are respectively generated in the first timing and the second timing, the pixels 141 can display different images in the first timing and the second timing, such that the pixel light transformed from different groups of the light focused to different groups of the pixel sub-regions (for example, the group of the pixel first sub-regions and the group of the pixel second sub-regions 141y) displays different images. Because the pixel light formed by different groups of the pixel sub-regions will be directed to different views by the third lenticular lens 151 (because the deposition positions of different groups of the pixel sub-regions are different), the pixel light formed in the first timing will be directed to five views by the third lenticular lens 150, and the pixel light formed in the second timing will be directed to other five views by the third lenticular lens 150. Therefore, the image resolution observed by the user in each view will be one-fifth of the resolution of the portrait display module 140, but ten images in ten views are generated by the stereo display device 100. In other words, the stereo display device 100 uses a simple optical configuration to generate the spatial-multiplex effect and the time-multiplex effect. The spatial-multiplex effect generates five different images in five views when the image resolution observed by the user in each view is one-fifth of the resolution of the portrait display module 140. The time-multiplex effect doubles the number of the views (the multiplier equals the number of the timing), such that the number of views becomes ten.

The portrait display module 140 is located on a focal plane of the third lenticular lens 150. Embodiments of this disclosure are not limited thereto. The person having ordinary skill in the art can make proper modifications to the portrait display module 140 and the third lenticular lens 150 depending on the actual application.

As shown in FIG. 4 and FIG. 5, each of the third cylindrical lenses 151 has a pitch P3 along the first direction H, and the pitch P3 is five thirds times the width W2 of the pixels 141. The magnitude of the pitch P3 can determine the number of the views generated by the stereo display device 100. The greater the pitch P3, the more the number of the views generated by the stereo display device 100. For example, if the pitch P3 is eight thirds times the width W2, the stereo display device 100 generates eight views. If the pitch P3 is three times the width W2, the stereo display device 100 generates night views.

Figure 7:
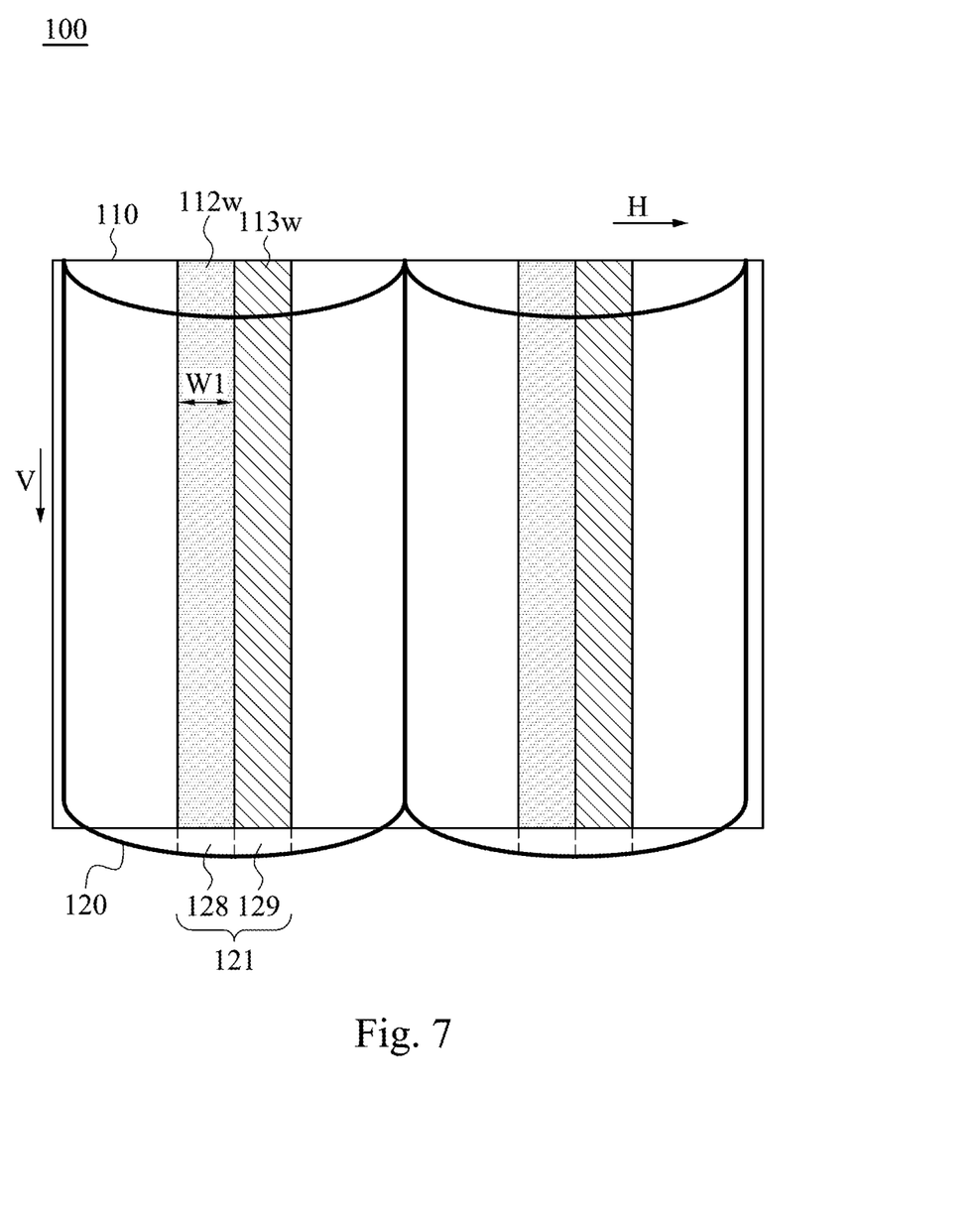
FIG. 7 is a schematic partial front view of the light source module and the first lenticular lens according to another embodiment of this disclosure.
Figure 8:
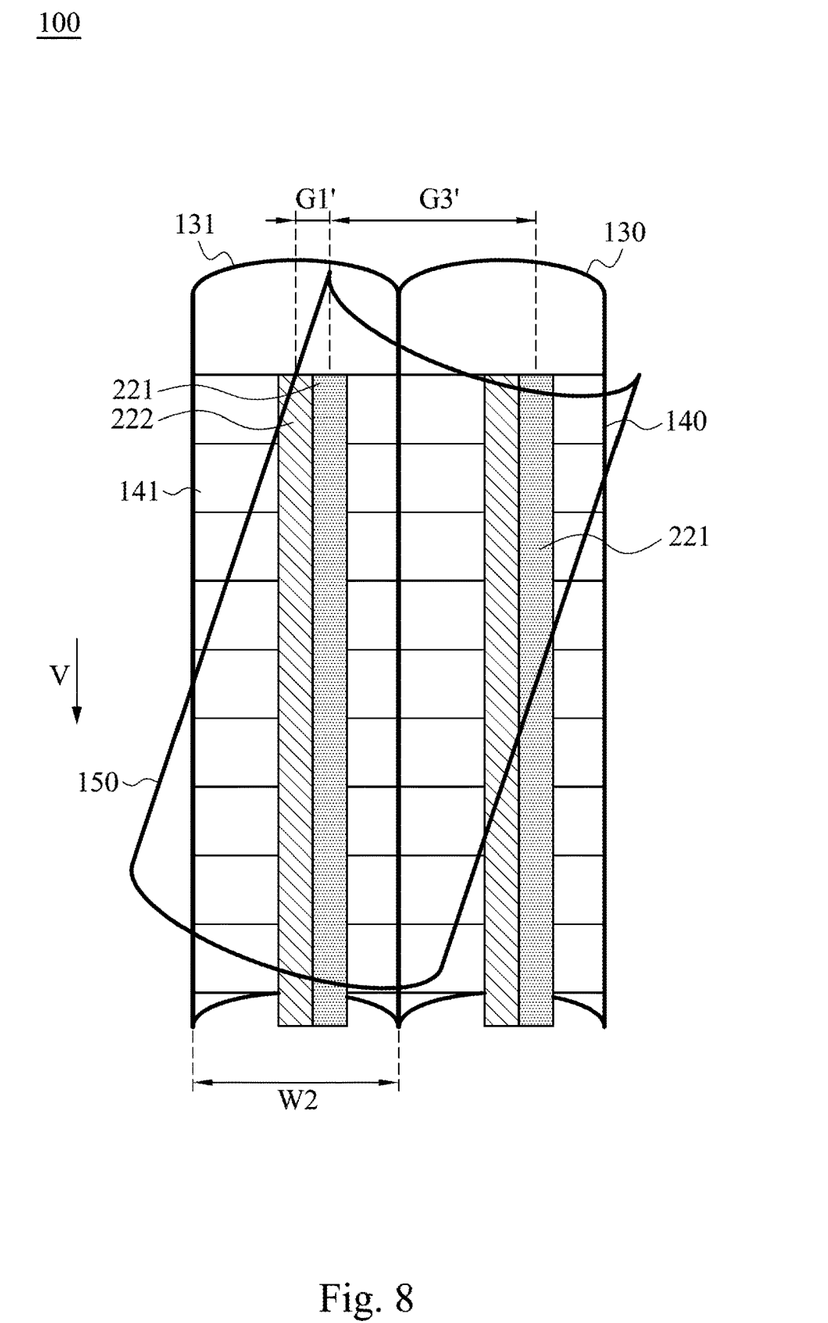
FIG. 8 is a schematic partial front view of the portrait display module according to another embodiment of this disclosure.
Figure 9:
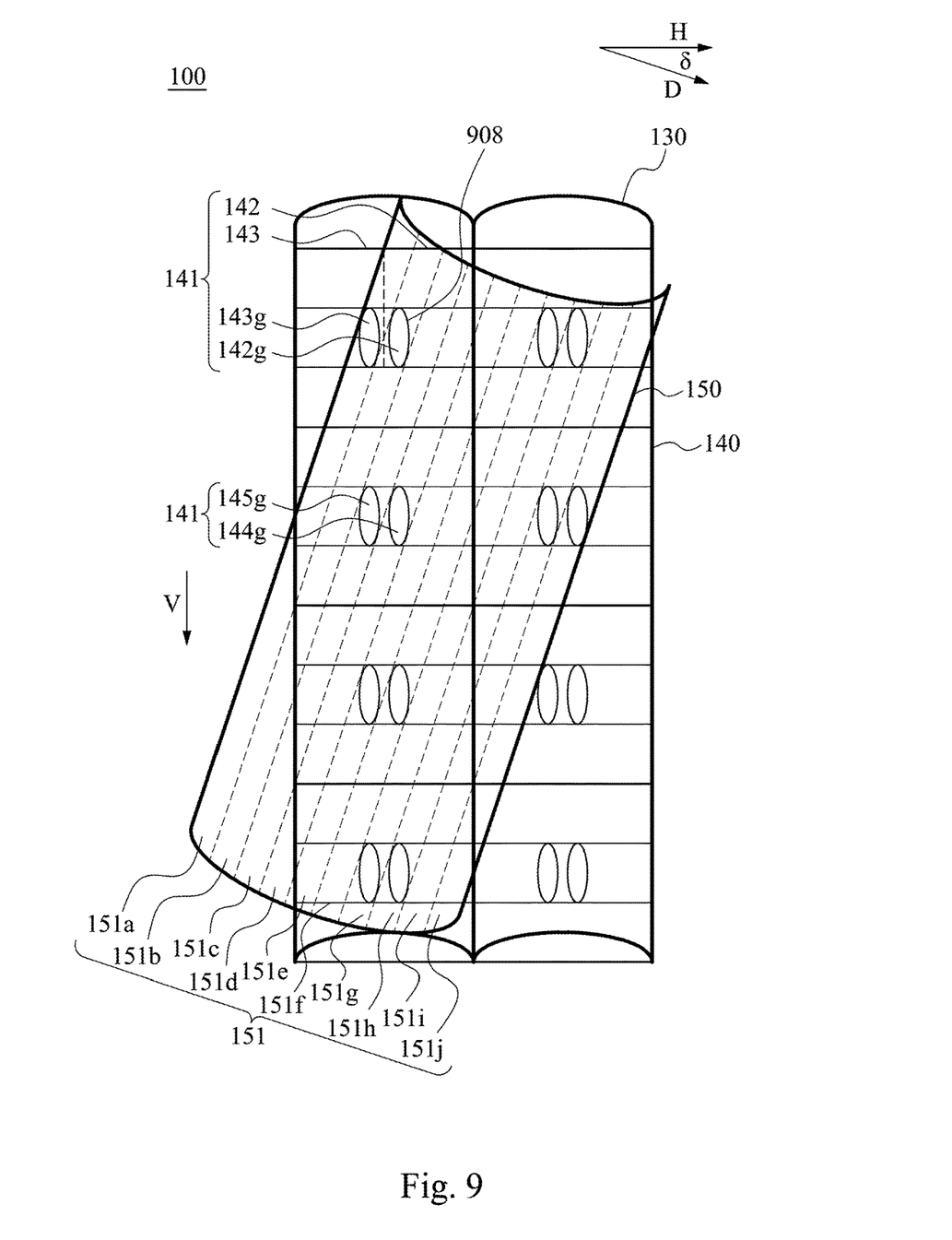
FIG. 9 is a schematic partial front view of the portrait display module and the third lenticular lens according to another embodiment of this disclosure.

FIG. 7 is a schematic partial front view of the light source module 110 and the first lenticular lens 120 according to another embodiment of this disclosure. FIG. 8 is a schematic partial front view of the portrait display module 140 according to another embodiment of this disclosure. FIG. 9 is a schematic partial front view of the portrait display module 140 and the third lenticular lens 150 according to another embodiment of this disclosure. As shown in FIG. 7, FIG. 8, and FIG. 9, the stereo display device 100 of this embodiment is similar to the stereo display device 100 of the aforementioned embodiments, and the differences between the two are mainly described below.

As shown in FIG. 7, the light source module 110 includes a plurality of light sources, and the light sources includes a plurality of first white light sources 112w and a plurality of second white light sources 113w.

The first white light sources 112w and the second white light sources 113w are stripe-shaped. Long axes of the first white light sources 112w and long axes of the second white light sources 113w are perpendicular to the first direction H.

Each of the light sources has a width W1 along the first direction H. Each of the first white light source 112w is disposed on the left side of each of the second white light sources 113w, and the length of the orthogonal projections of the spacing between the centers of the first white light sources 112w and the second white light sources 113w along the first direction H is the width W1. The length of the spacing between the first white light sources 112w and the adjacent first white light sources 112w along the first direction H is six times the width W1. The length of the spacing between the second white light sources 113w and the adjacent second white light sources 113w along the first direction H is six times the width W1.

Each of the first cylindrical lenses 121 is divided into a first part 128 and a second part 129 along the first direction H. The first part 128 corresponds to the first white light sources 112w, and the second part 129 corresponds to the second white light sources 113w. Besides the first part 128 and the second part 129, the first cylindrical lens 121 also includes other parts, but other parts of the first cylindrical lens 121 will not be discussed here.

Therefore, similar to FIG. 3, the first lenticular lens 120 respectively directs the light emitted by the first white light sources 112w and the second white light sources 113w to travel in different groups of directions.

The orthogonal projection of the first part 128 along a direction perpendicular to the first direction H and the second direction V overlaps the deposition positions of the first white light sources 112w, i.e., the first part 128 corresponds to the first white light sources 112w. The orthogonal projection of the second part 129 along a direction perpendicular to the first direction H and the second direction V overlaps the deposition positions of the second white light sources 113w, i.e., the second part 129 corresponds to the second white light sources 113w.

The first white light sources 112w emit light in the first timing, and the second white light sources 113w emit light in the second timing.

In some embodiments, the first white light sources 112w and the second white light sources 113w are light-emitting diodes. Embodiments of this disclosure are not limited thereto. The person having ordinary skill in the art can make proper modifications to the first white light sources 112w and the second white light sources 113w depending on the actual application.

As shown in FIG. 1, FIG. 7, and FIG. 8, the second lenticular lens 130 respectively focus the light traveling in different groups of directions to the first focus regions 221 and the second focus regions 222. Specifically, the second lenticular lens 130 focuses the light emitted by the first white light sources 112w to the first focus regions 221 and the light emitted by the second white light sources 113w to the second focus regions 222. As shown in FIG. 9, the pixels 141 are further divided into the first sub-regions 142 and the second sub-regions 143 along the first direction H. The first focus regions 221 correspond to the first sub-regions 142, and the second focus regions 222 correspond to the second sub-regions 143.

Therefore, in the portrait display module 140, the first sub-region 142 of each of the pixels 141 transforms the light focused to the first focus regions 221 into pixel light, and the second sub-region 143 of each of the pixels 141 transforms the light focused to the second focus regions 222 into pixel light.

A gap G1' between the center line of the first focus region 221 and the center line of the adjacent second focus region 222 along the first direction H is determined by the first focal length of the first lenticular lens 120, the second focal length of the second lenticular lens 130, and the spacing between the centers of the first white light sources 112w and the second white light sources 113w, which equal the width W1.

The ratio of the spacing between the centers of the first white light source 112w and the second white light source 113w, which equals the width W1, to the spacing G1' is the same as the ratio of the first focal length of the first lenticular lens 120 to the second focal length of the second lenticular lens 130.

A gap G3' between the first focus region 221 and the adjacent first focus region 221 along the first direction H may be determined by the first focal length of the first lenticular lens 120, the second focal length of the second lenticular lens 130, and the spacing between the first white light sources 112w and the adjacent first white light sources 112w, which is six times the width W1.

The ratio of the spacing between the first white light source 112w and the adjacent first white light source 112w, which is six times the width W1, to the spacing G3' is the same as the ratio of the first focal length of the first lenticular lens 120 to the second focal length of the second lenticular lens 130. Other ratio relations are similar to the aforementioned ratio relations, so other ratio relations will not be described here. As shown in FIG. 8, the spacing G3' equals the width of one pixel, and the spacing G3' is six times the spacing G1'.

As shown in FIG. 9, the first parts 151a, the second parts 151b, the third parts 151c, the fourth parts 151d, the fifth parts 151e, the sixth parts 151f, the seventh parts 151g, the eighth parts 151h, the ninth parts 151i, and the tenth parts 151j respectively correspond to different groups of the sub-pixel sub-regions. For example, the first parts 151a correspond to one group of the green sub-pixel second sub-regions 143g. The second parts 151b correspond to one group of the green sub-pixel first sub-regions 142g. The third parts 151c correspond to one group of the green sub-pixel second sub-regions 145g. The fourth parts 151d correspond to one group of the green sub-pixel first sub-regions 144g. Marks 908 indicate the green sub-pixel first sub-regions 142g and 144g and the green sub-pixel second sub-regions 143g and 145g.

Therefore, the third lenticular lens 150 respectively directs ten groups of the pixel light generated by different pixel sub-regions to ten views.

It is noted that, in this embodiment, light emitted by different sub-pixels of one pixel 141 may not be directed to the same view. However, by proper data signal processing, the portrait display module 140 can display the correct image information, such that the correct images are shown in different views.

The orthogonal projections of the ten parts along a direction perpendicular to the first direction H and the second direction V respectively overlap the deposition positions of different groups of the sub-pixel sub-regions, i.e., the first parts 151*a*, the second parts 151*b*, the third parts 151*c*, the fourth parts 151*d*, the fifth parts 151*e*, the sixth parts 151*f*, the seventh parts 151*g*, the eighth parts 151*h*, the ninth parts 151*i*, and the tenth parts 151*j* respectively correspond to different sub-pixel sub-regions.

Some features of the stereo display device 100 can be summarized from the aforementioned embodiments, and the features are described below.

When the light source module 110 includes a plurality of white light sources, the stereo display device 100 has a direction perpendicular to the long axes of the first cylindrical lenses 121. Each of the first cylindrical lenses 121 is divided into K parts along the direction, and different parts respectively correspond to K groups of the white light sources. The first lenticular lens 120 respectively directs K groups of the timing light to travel in K groups of directions, and each of the pixels includes K sub-regions. The second lenticular lens 130 respectively focuses the K groups of the timing light traveling in the K groups of the directions to K groups of the focus regions, and the K groups of the focus regions respectively correspond to the K sub-regions.

When the light source module 110 includes a plurality of red light sources, a plurality of green light sources, and a plurality of blue light sources, the stereo display device 100 has a direction perpendicular to the long axes of the first cylindrical lenses 121. Each of the first cylindrical lenses 121 is divided into 3K parts along the direction, and different parts respectively correspond to K groups of the red light sources, K groups of the green light sources, and K groups of the blue light sources. The K groups of the red light sources, the K groups of the green light sources, and the K groups of the blue light sources form 3K groups of the timing light in K timings. The first lenticular lens 120 respectively directs the 3K groups of the timing light to travel in 3K groups of the directions. Each of the pixels includes K sub-regions, and each of the sub-regions includes a red sub-pixel sub-region, a blue sub-pixel sub-region, and a green sub-pixel sub-region. The second lenticular lens 130 respectively focuses the 3K groups of the timing light traveling in the 3K groups of the directions to 3K groups of the focus regions, and the 3K groups of the focus regions respectively correspond to the K red sub-pixel sub-regions, the K blue sub-pixel sub-regions, and the K green sub-pixel sub-regions.

By performing two optical Fourier transforms on different groups of the light (for example, the first timing light $L_{T1}$ and the second timing light $L_{T2}$) from the light source module 110 by the first lenticular lens 120 and the second lenticular lens 130, different groups of the light will be respectively focus to different sub-pixel sub-regions. Because different groups of the light are respectively generated in the first timing and the second timing, pixels 141 can display different images in the first timing and the second timing, such that the pixel light transformed from different groups of the light focused to different sub-pixel sub-regions displays different images. Because pixel light formed by different sub-pixel sub-regions will be directed to different views by the third lenticular lens 151 (because the deposition positions of different sub-pixel sub-regions are different), the pixel light formed in different timings will be directed to different views by the third lenticular lens 150. For example, when there are a first timing and a second timing in a cycle, the pixel light formed in the first timing is directed to five views by the third lenticular lens 150, and the pixel light formed in the second timing is directed to other five views by the third lenticular lens 150, the image resolution observed by the user in each view will be one-fifth of the resolution of the portrait display module 140, but ten images in ten views are generated by the stereo display device 100. In other words, the stereo display device 100 uses a simple optical configuration to generate the spatial-multiplex effect and the time-multiplex effect. The spatial-multiplex effect generates K different images in K views when the image resolution observed by the user in each view is 1/K of the resolution of the portrait display module 140. The time-multiplex effect makes the number of the views become N times of the original number (the multiplier equals the number of the timings), such that the number of views becomes N×K.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, 6th paragraph. In particular, the use of "step of" in the claims herein is not intended to invoke the provisions of 35 U.S.C. § 112, 6th paragraph.

What is claimed is:

1. A stereo display device, comprising:
   a light source array comprising a plurality of light sources and configured to sequentially provide a plurality of groups of timing light;
   a first lenticular lens disposed in front of the light source array and configured to respectively direct the timing light from the light source array to travel in a plurality of groups of directions, wherein the light source array is located on a focal plane of the first lenticular lens;
   a second lenticular lens disposed in front of the first lenticular lens;
   a portrait display panel disposed in front of the second lenticular lens and located on a focal plane of the second lenticular lens, the portrait display panel comprising a plurality of pixels, wherein each of the pixels comprises a plurality of sub-regions; the second lenticular lens is configured to respectively focus the timing light traveling in the groups of the directions to a plurality of groups of focus regions; the focus regions respectively correspond to the sub-regions; and the portrait display panel is configured to respectively transform the timing light focused on the focus regions into a plurality of groups of pixel light; and
   a third lenticular lens disposed in front of the portrait display panel and configured to respectively direct the pixel light to a plurality of views.

2. The stereo display device of claim 1, further comprising a first direction and a second direction perpendicular to the first direction, wherein the pixels are disposed along the first direction and the second direction, and each of the pixels comprises a plurality of sub-pixels with different colors that are disposed along the second direction side by side; the first lenticular lens has a plurality of first cylindrical lenses, the second lenticular lens has a plurality of second cylindrical lenses, and the third lenticular lens has a plurality of third cylindrical lenses, wherein long axes of the first cylindrical lenses are perpendicular to the first direction, long axes of the second cylindrical lenses are perpendicular to the first direction, and long axes of the third cylindrical lenses are slanted with respect to the first direction.

3. The stereo display device of claim 2, wherein the portrait display panel is located on a focal plane of the third lenticular lens.

4. The stereo display device of claim 3, wherein the first lenticular lens has a first focal length, and each of the first cylindrical lenses has a first pitch along the first direction; the second lenticular lens has a second focal length, and each of the second cylindrical lenses has a second pitch along the first direction, wherein a ratio of the first focal length to the second focal length is the same as a ratio of the first pitch to the second pitch.

5. The stereo display device of claim 4, wherein each of the pixels has a first width along the first direction, and the first width is the same as the second pitch.

6. The stereo display device of claim 2, wherein the light source array comprises a plurality of white light sources.

7. The stereo display device of claim 6, wherein each of the first cylindrical lenses is divided into K parts along the first direction, and the parts respectively correspond to K groups of the white light sources, wherein the first lenticular lens is configured to respectively direct K groups of the timing light to travel in K groups of the directions, and each of the pixels comprises K sub-regions; the second lenticular lens is configured to respectively focus the K groups of the timing light traveling in the K groups of the directions to K groups of the focus regions; and the K groups of the focus regions respectively correspond to the K sub-regions.

8. The stereo display device of claim 2, wherein the light source array comprises a plurality of red light sources, a plurality of green light sources, and a plurality of blue light sources.

9. The stereo display device of claim 8, wherein each of the first cylindrical lenses is divided into 3K parts along the first direction, and the parts respectively correspond to K groups of the red light sources, K groups of the green light sources, and K groups of the blue light sources, wherein the K groups of the red light sources, the K groups of the green light sources, and the K groups of the blue light sources form 3K groups of the timing light; the first lenticular lens is configured to respectively direct the 3K groups of the timing light to travel in 3K groups of the directions; each of the pixels comprises K sub-regions, wherein each of the sub-regions comprises a red sub-pixel sub-region, a blue sub-pixel sub-region, and a green sub-pixel sub-region; and the second lenticular lens is configured to respectively focus the 3K groups of the timing light traveling in the 3K groups of the directions to 3K groups of the focus regions, and the 3K groups of the focus regions respectively correspond to the K red sub-pixel sub-regions, the K blue sub-pixel sub-regions, and the K green sub-pixel sub-regions.

\* \* \* \* \*